United States Patent [19]

Heuer et al.

[11] Patent Number: 5,679,761
[45] Date of Patent: Oct. 21, 1997

[54] IMINODISUCCINATE-CONTAINING POLYMERS

[75] Inventors: Lutz Heuer, Krefeld; Winfried Joentgen; Torsten Groth, both of Köln; Hans-Joachim Traenckner, Leverkusen; Nikolaus Müller, Monheim; Hermann Uhr, Krefeld; Klaus-Peter Heise, Odenthal; Karl-Hermann Brücher, Velbert; Joachim-Reinhard Wesener, Köln; Ute Wollborn, Krefeld; Hans-Georg Pirkl, Köln; Thomas Menzel, Hilden; Ulrich Liesenfelder, Köln; Paul Wagner, Düsseldorf, all of Germany

[73] Assignee: Bayer AG, Leverkusen, Germany

[21] Appl. No.: 515,356

[22] Filed: Aug. 15, 1995

[30] Foreign Application Priority Data

Apr. 6, 1995 [DE] Germany ............... 195 12 898.2

[51] Int. Cl.$^6$ .................................................. C08G 73/10
[52] U.S. Cl. ............................... 528/363; 528/288
[58] Field of Search ....................... 528/363, 288

[56] References Cited

U.S. PATENT DOCUMENTS

| | | | |
|---|---|---|---|
| 4,590,260 | 5/1986 | Harada et al. | 528/328 |
| 4,839,461 | 6/1989 | Boehmke | 528/363 |
| 5,288,783 | 2/1994 | Wood | 525/418 |
| 5,296,578 | 3/1994 | Koskan et al. | 528/363 |
| 5,393,868 | 2/1995 | Freeman et al. | 528/480 |
| 5,468,838 | 11/1995 | Boehmke et al. | 528/363 |

FOREIGN PATENT DOCUMENTS

WO 94/01486  1/1994  WIPO.

OTHER PUBLICATIONS

*Polycondensation of Thermal Precursors of Aspartic Acid*, Kaoru Harada, J. Org.Chem., vol. 24, pp. 1662–1666 (Nov. 1959).

*Chemical Studies of Polyaspartic Acids*, Kovacs et al., J.Org.Chem., vol. 26, pp. 1084–1091 (Apr. 1961).

Orbit Abstract of WO 94/01486 (Jan. 20, 1994).

Primary Examiner—Joseph L. Schofer
Assistant Examiner—Wu C. Cheng
Attorney, Agent, or Firm—Connolly & Hutz

[57] ABSTRACT

The polymers according to the invention with repeating succinyl units additionally contain iminodisuccinate units.

20 Claims, No Drawings

IMINODISUCCINATE-CONTAINING POLYMERS

The invention relates to novel polymers with repeating succinyl units which also contain iminodisuccinate units, and to a process for their preparation.

The preparation and use of polyaspartic acid (PAA) and its derivatives has been the subject of numerous publications and patents for a long time.

According to J. Org. Chem., 24, pages 1662–1666, (1959), polysuccinimide (PSI), which is called "anhydropolyaspartic acid" there, is obtained by thermal polycondensation of maleamic acid or maleamic acid monoammonium salt at temperatures of up to 200° C. The polymer yields at 200° C. were 75% to 79%. Malic acid, maleic anhydride, fumaric acid and asparagine are furthermore mentioned as possible starting substances.

The preparation can also be carried out by thermal polycondensation of aspartic acid according to J. Org. Chem. 26, 1084 (1961). Polysuccinimide (PSI), which is also called "anhydropolyaspartic acid" there, initially occurs as an intermediate. PSI can be converted into PAA by hydrolysis.

U.S. Pat. No. 4,839,461 (=EP-A 0 256 366) describes the preparation of polyaspartic acid from maleic anhydride, water and ammonia. Maleic anhydride is reacted in an aqueous medium with the addition of concentrated ammonia solution, and is then polymerized. During this polymerization, the mass initially becomes highly viscous and then solid-porous, which requires handling which is expensive in terms of process technology.

It is known from U.S. Pat. No. 4,590,260 that amino acids can be subjected to polycondensation together with derivatives of malic, maleic and/or fumaric acid at 100° to 225° C. According to U.S. Pat. No. 4, 696,981, microwaves can be employed successfully for carrying out such a reaction.

U.S. Pat. No. 5,296,578 describes the preparation of PSI from maleic anhydride, water and ammonia. Maleic anhydride is hydrolyzed to maleic acid in water and the maleic acid is then converted into the ammonium salt with concentrated ammonia solution. The water is evaporated off from the solution in a stirred reactor and finally the monoammonium salt is polymerized in bulk to give PSI at temperatures above 170° C. During this reaction, the mass is converted into solid PSI via highly viscous phase states in the course of several hours, and the PSI is then hydrolyzed to PAA.

U.S. Pat. No. 5,288,783 describes the preparation of PAA from maleic acid or fumaric acid, water and ammonia. Maleic anhydride is mixed with water in a stirred tank and is converted into maleic acid, while cooling. The maleic acid monoammonium salt is prepared by addition of concentrated ammonia solution. The water contained in the mixture is then evaporated off and the dry monoammonium salt is polymerized at temperatures of 190° to 350° C. An alternative proposal is further processing of the monoammonium salt, which is present in aqueous solution, at temperatures of 160° to 200° C. by extrusion to give PSI. The PSI prepared by one of the two process routes is then hydrolyzed under alkaline conditions to give PAA.

EP-A 593 187 describes the preparation of PSI by thermal polymerization of maleamic acid at temperatures of 160° to 330° C. over a reaction time of from 2 minutes to 6 hours. Reference is also made to polycondensation in a solvent using condensation auxiliaries.

Although DE-A 4 221 875 describes the preparation of modified polyaspartic acids by polycondensation and their use as additives for detergents, cleaning agents, water treatment agents and agents for preventing deposits in the evaporation of sugars, no iminodisuccinate-containing polyaspartic acids are mentioned.

The invention relates to polymers with repeating succinyl units which contain iminodisuccinate units. These iminodisuccinate units can be present as an end group and/or as repeating units. A process has furthermore been found for the preparation of these polymers, which comprises subjecting maleic anhydride, maleic acid, maleic acid derivatives, fumaric acid or derivatives thereof and if appropriate comonomers, such as, for example, aspartic acid and asparagine, to thermal polymerization in the presence of excess ammonia, and if appropriate completely or partly neutralizing the resulting primary polymerization products in the presence of a base and if appropriate in the presence of further maleic acid.

The novel copolymers according to the invention preferably contain repeating succinyl units having at least one of the following structures

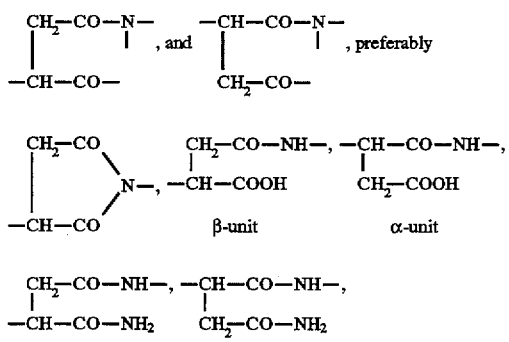

or a salt thereof.

The iminodisuccinate units preferably have at least one of the following structures:

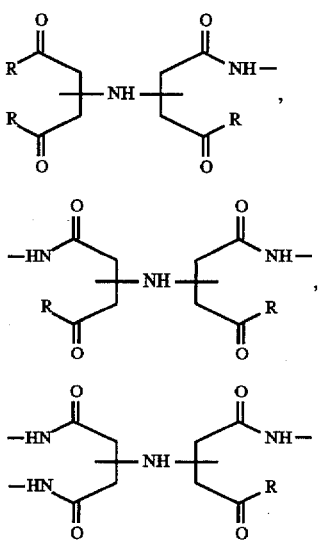

and

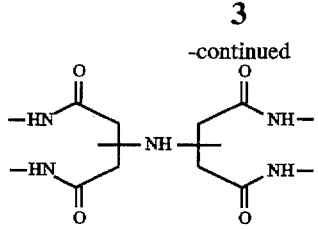

in which R denotes OH, O⁻NH₄⁺ or NH₂.

The polymer prepared, depending on the reaction conditions, e.g. residence time and temperature of the thermal polymerization, shows different chain lengths or molecular weights after gel permeation chromatographic analysis ($M_w$=500 to 10,000, preferably 500 to 5,000, particularly preferably 700 to 4,500). The proportion of the β-form is generally more than 50%, in particular more than 70%, based on the sum of the repeating units

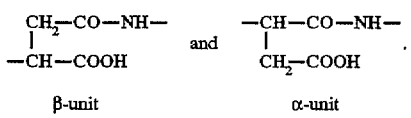

The iminodisuccinate units can be present in the polymer in random distribution or, preferably, as an end group. The iminodisuccinate unit is in general present to the extent of at least 0.1 mol %, based on the sum of all the repeating units. The molar ratio of the iminodisuccinate units incorporated in the polymer to the sum of all the monomer units incorporated in the polymer is preferably 0.1 mol % to 99 mol %, preferably 1 mol % to 50 mol %, particularly preferably 2 mol % to 25 mol %.

By a suitable reaction procedure and choice of the precursors, the products can additionally contain further repeating units, for example a) malic acid units of the formula

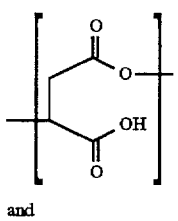

and

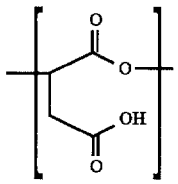

b) maleic acid and fumaric acid units of the formula

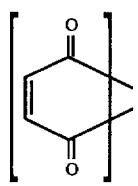

and

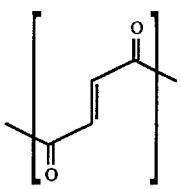

Maleic anhydride, maleic acid, maleic acid derivatives, fumaric acid and fumaric acid derivatives are employed as precursors (A). Ammonia in liquid form, in gaseous form or dissolved in suitable solvents, as well as ammonia-donating compounds, such as ammonium salts of an organic or inorganic acid, for example mono- or diammonium carbonate, ammonium chloride, ammonium acetate and the like, can be used as the nitrogen-containing component (B). Comonomers (C), such as aspartic acid, asparagine and malic add, citric acid, itaconic acid, citraconic acid and aconitic acid, can furthermore be added.

The precursors can be employed individually or as mixtures, in bulk or in solution. The polymers according to the invention can be present as free acids and as a salt, preferably as alkali or ammonium salt.

In a preferred embodiment, maleic anhydride or its derivatives are employed as a melt.

If appropriate, the reaction of the precursors can be carried out in the presence of a solvent. Suitable solvents are water, lower alcohols, polar aprotic solvents, such as dimethylformamide, N-alkylpyrrolidone, sulfolane, acetone, polyalkylene. glycols, polyalkylene glycol monoalkyl ethers and polyalkylene glycol dialkyl ethers. Supercritical gases, such as, for example, carbon dioxide and ammonia, are also suitable. Water is particularly suitable.

In a preferred embodiment, the precursors are molten maleic anhydride (precursor A) and ammonia solution, in particular an aqueous ammonia solution (precursor B).

Maleic anhydride or derivatives thereof are preferably employed as precursor A in amounts such that the molar ratio of nitrogen in precursor B with respect to the maleic anhydride or a derivative thereof in precursor A is between 1.1 and 5.0, preferably between 1.5 and 4.0, and especially preferably between 1.9 and 4.0.

The polymers according to the invention are obtainable by various process routes. Thus, for example, intermediates such as maleic acid diammonium salt or maleamic acid ammonium salt can be prepared from the abovementioned precursors in a separate process step and then subjected to thermal polymerization discontinuously or continuously, in bulk or in suitable solvents.

The thermal polymerization is in general carried out at temperatures between 100° C. and 350° C., preferably between 120° C. and 220° C., particularly preferably between 120° C. and 190° C. The residence time is preferably between 1 second and 600 minutes, preferably 5 seconds and 180 minutes, particularly preferably 10 seconds and 150 minutes.

Another process for the preparation of the polymers according to the invention comprises the following steps:

a) At least one of the precursors mentioned above under A is continuously brought into contact with at least one of the precursors mentioned above under B, if appropriate in the presence of a fluidizing agent and also if appropriate with the addition of one of the comonomers described under C.

b) The reaction mixture obtained in situ is polymerized continuously in a suitable reactor at temperatures of 100° C. to 350° C., preferably 120° C. to 220° C., and particularly preferably 120° C. to 190° C., with residence times of 1 second to 600 minutes, particularly preferably 5 seconds to 180 minutes and particularly preferably 10 seconds to 150 minutes.

c) If appropriate, at the end of the polymerization, further maleic anhydride or further maleic acid and a base can be metered in. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like.

A preferred embodiment of the general process described above comprises carrying out the reaction of the precursors (A, B) largely adiabatically in the first reaction step and employing the heat of reaction thereby liberated to bring the reaction mixture to the polymerization temperature, and at least partly polymerizing the N-containing low molecular weight derivative in the second reaction step, to give a polymer with repeating succinyl units.

Suitable devices for sufficient rapid mixing of two streams of liquid are known from many literature references and patents (for example Ullmann: Encyclopedia of Industrial Chemistry, 1982, volume B2, chapter 25; volume B4, 561–586 ; Perry's Chemical Engineer's Handbook, 6th edition (1984), Mc-Graw-Hill, N.Y., 21–61 ; M. H. Pohl, E. Muschelknautz, Chem. Ing. Tech. 51 (1979), 347–364 ; Chem. Ing. Tech. 52 (1980), 295 –291).

Preferred devices for rapid mixing of the streams of precursors are all types of jet mixers, static mixers and dynamic mixers. Particularly preferred devices for rapid mixing of the precursors and for starting the exothermic reaction are jet mixers, other advantages of which are hermetic tightness, variably adjustable mixing energy and global plug flow characteristics.

In a preferred embodiment, the precursors are mixed in a rapid-mixing apparatus of the abovementioned construction when carrying out the 1st reaction step to reduce undesirable side reactions, and in parallel with this or thereafter exothermic formation of the intermediates is carried out. The heat thereby liberated is essentially stored in the precursor-intermediate mixture. The reaction mixture is thereby brought to the polymerization temperature, and if appropriate all or at least some of the organic solvent or the water and the water formed during the reaction is evaporated. In a particularly preferred embodiment, mixing is carried out in <2 seconds and exothermic formation of the intermediates is carried out in less than 60 seconds. The reaction mixture emerging from the first reaction stage is then polymerized in a suitable apparatus.

All apparatuses which allow the necessary minimum residence time for polymerization with a narrow residence time distribution of the viscous-liquid phase, and at the same time at least partial evaporation of the solvent, in particular of the water, and of the water formed during the reaction are in principle suitable for the thermal polymerization.

Preferred devices for the thermal polymerization are thus all apparatuses which have a defined residence time with a narrow residence time distribution for the solid or highly viscous liquid phase and at the same time allow good temperature control by at least partial evaporation of the solvent (organic solvent and/or water) and/or of the water of reaction formed during the polymerization. Such preferred devices can be, for example, a) delay tubes b) high viscosity reactors (for example screw, List reactor)

c) dryers (for example paddle dryer, spray dryer)

d) stirred tank cascade e) thin film evaporator f) multiphase helical tube reactors (MPHR) (DT 1 667 051, DE-A 219 967)

Particularly good remits are achieved if the precursors (A, B) are fed to a jet mixer, downstream of which is a tube reactor or a multiphase helical tube. This apparatus combination has proved to be particularly suitable for carrying out the process according to the invention.

The reactor temperature for the reactions carried out can be controlled by complete or else partial circulation of the reaction mixture in combination with removal of heat. All reactors of the abovementioned construction with recycling of the reaction mixture in combination with removal of heat and all loop reactors are suitable in particular for such a reaction procedure.

In another variant of the process according to the invention, in order to avoid too rapid and too severe an increase in temperature of the reaction mixture because of the highly exothermic rapid formation of intermediates, one precursor component can be metered in at several points along the tube or multiphase helical tube reactor in a suitable manner, so that an optimum temperature profile can be achieved. This avoids the occurrence of temperatures which are too high and which can lead to product damage.

The comonomers (C) which are to be added if appropriate can also be added likewise. Furthermore, the last metering point, which is shortly before the reactor exit, can be used to add one of the abovementioned bases and if appropriate further precursor A, in order to achieve grafting of the polymer with iminodisuccinate units.

The precursors can be mixed at temperatures of between 0° C. and 200° C., depending on the precursors used. The exothermic adiabatic reaction of the first reaction step then provides sufficient heat for the second reaction step to take place at 100° to 350° C., preferably at 120° to 220° C., and particularly preferably at 120° to 190° C., depending on the nature and concentration of the precursors used. The temperature is advantageously adjusted by the pressure in the reactor and the flow rates of the precursors (A, B) fed in, as well as the content of organic solvent and/or water. Cooling and heating media can also be employed to assist the temperature control during the reaction. Furthermore, product-precursor regions with different temperatures can be brought into contact directly or indirectly in the reaction system for the purpose of heat exchange.

The residence times of the abovementioned precursors in the reactor system described above are up to 600 minutes. Residence times of up to 180 minutes are preferred. Residence times which decrease as the temperature rises are particularly preferred. The residence time in the reactor system is preferably chosen such that practically complete reaction of the precursor A employed in less than the equivalent mount, preferably maleic anhydride, is ensured. For virtually complete polymerization it may be necessary for the monomer and oligomer mixture already obtained shortly after mixing in the first reaction zone, particularly preferably in a tube reactor, to be reacted in a further device proposed above, preferably a high-viscosity reactor. However, such a high-viscosity reactor can particularly preferably be dispensed with, and complete polymer formation already takes place in a delay tube, preferably in a multiphase helical tube. The reaction products obtained are hot solutions or solvent-containing or water-containing melts, because of the reaction enthalpy liberated and depending on the water or solvent content. The reaction enthalpy can largely be utilized in the reactor. Optimum heat control with low investment and operating costs in a chemical engineering plant, leading to high economic efficiency, is thereby achieved.

If the oligomer-containing melts are employed in a high-viscosity reactor, in a preferred reaction procedure the rate of reaction can be increased considerably in such a device by the already preheated viscous mass, which is partly depleted by evaporation of solvents because of the heat of reaction liberated, in contrast to the direct synthesis from the intermediates of maleic acid diammonium salt or maleamic acid ammonium salt which is likewise possible. The residence time is significantly reduced compared with the prior art by this procedure.

If the primary polymerization products are ring systems, these can be converted into a system containing open structures, for example a copolymer salt containing PAA, by reaction with a base, if appropriate in the presence of water. This conversion of, for example, PSI-containing copolymers into PAA-containing copolymers is effected by hydrolysis in a suitable device. A pH of between 5 and 14 is preferably suitable here in the aqueous system. In a particularly preferred form, a pH of 7 to 12 is chosen, in particular by addition of a base. Suitable bases are alkali metal and alkaline earth metal hydroxides or carbonates, such as, for example, sodium hydroxide solution, potassium hydroxide solution, sodium carbonate or potassium carbonate, ammonia and amines, such as triethylamine, triethanolamine, diethylamine, diethanolamine, alkylamines and the like.

The temperature during the hydrolysis is suitably in a range including up to the boiling point of the suspension or solution containing succinyl groups, and is preferably 20° to 150° C. If appropriate, the hydrolysis is carried out under pressure. The hydrolysis is carried out with the addition of another monoethylenically unsaturated carboxylic acid derivative, if appropriate. Suitable derivatives are, for example, maleic anhydride, maleic acid, citraconic acid, itaconic acid, aconitic acid, acrylic acid and fumaric acid.

Addition of the amino groups of the N-terminal end of the polymer molecule onto the monoethylenically unsaturated carboxylic acid derivative present in the salt form can take place under the basic conditions of the hydrolysis.

The primary polymerization products can also have ethylenically unsaturated end groups, depending on the polymerization conditions described above. It may therefore be expedient also to add aminocarboxylic acids, for example glycine, aspartic acid, lysine, glutamic acid and the like, if appropriate, to the reaction mixture during the basic hydrolysis. Grafting of the polymer end groups is achieved by this measure.

The primary polymerization products were characterized by means of elemental analysis. In addition to carbon and hydrogen, three different types of nitrogen were also determined here. The analysis differentiated between ionically bonded nitrogen (ammonium ions), hydrolyrically sensitive nitrogen (for example amide or imide nitrogen) and "non-hydrolyzable" nitrogen (amine nitrogen). It was possible in this manner to monitor the optimum hydrolysis necessary for improved efficacy.

The polymers according to the invention are distinguished by an improved calcium-bonding capacity. They furthermore display complexing properties with respect to heavy metals, such as, for example, copper, iron and the like. They can be used as an additive in low-phosphate and phosphate-free detergents and cleaning agents. The polymers are builders for detergents and have the effect of reducing encrustation and graying on washed textile goods during the washing operation.

The polymers according to the invention furthermore inhibit and delay the precipitation of salts, in particular crystals, for example of calcium carbonate, calcium sulfate, calcium phosphate, barium sulfate and magnesium silicate, from aqueous solutions and are therefore suitable as water treatment agents. They can be added to the water in cooling circulations, evaporators or seawater desalination plants, and to injected water for secondary oil production and water treatment in mining. They can furthermore be employed as agents which prevent deposits during evaporation of sugar juice.

On the basis of their complexing property with respect to heavy metals, the copolymers can also be used as stabilizing agents for bleaching agents such as hydrogen peroxide in bleaching processes.

The copolymers according to the invention are to be classified as biologically degradable in accordance with the "OECD Guidelines for testing of chemicals (1981)".

EXAMPLES

The primary polymerization products were characterized by means of elemental analysis. In addition to carbon and hydrogen, three different types of nitrogen were also determined here. The analysis differentiated between ionically bonded nitrogen (ammonium ions), hydrolytically sensitive nitrogen (for example amide or imide nitrogen) and "non-hydrolyzable" nitrogen (amine nitrogen). It was possible to monitor the optimum hydrolysis necessary for improved efficacy in this manner.

The polymers according to the invention obtained after the hydrolysis were analyzed with the aid of $^1$H-NMR and $^{13}$C-NMR both in the salt form and after conversion into the free acid. The imidodisuccinic acid units were identified with the aid of the chemical shifts of $\delta_1$=3.8 ppm ($^1$H-NMR) and $\delta_2$=55.5 ppm ($^{13}$C-NMR) for the CH groups and of $\delta_3$=2.7 ppm ($^1$H-NMR) and $\delta_4$=36.7 ppm ($^{13}$C-NMR) for the $CH_2$ groups. The residual monomer content was determined by HPLC and the polymer distribution by GPC against polyacrylates or polyaspartic acids from Sigma as a standard.

Example 1

268 g (2 mol) of maleamic acid ammonium salt and 72 g (2 mol) of water were mixed with one another in a 0.7 l V4A steel autoclave. The mixture was heated at 150° C. for 30 minutes. During this procedure, a pressure of about 4 bar built up. A red reaction mixture which is capable of flow at 80° C. was obtained. 100 g of water are also added so that the reaction mixture is also kept liquid at room temperature.

Elemental analysis: C: 23.1% N (total): 13% N (hydrolyzable): 2.3% $NH_4^+$: 5.6%

The reaction mixture also contained about 20% of monomeric aspartic acid and asparagine as well as 3% of maleic acid, based on the amounts employed. The reaction mixture was hydrolyzed with 20% strength sodium hydroxide solution at the boiling point (100°–105° C.), with the ammonia liberated being distilled off, until the residual content of hydrolyzable nitrogen was less than 3% of theory. 2.6 mol of NaOH were required for this. An aqueous solution of the polyaspartic acid copolymer sodium salt was obtained. The average molecular weight Mw was 1410.

Example 2

196 g (2 mol) of maleic anhydride and 90 g (5 mol) of water were mixed with one another in a 0.7 l V4A steel autoclave. The mixture was heated to 60° C. and stirred at this temperature for 30 minutes. 78.2 g (4.6 mol) of ammonia were then passed in at 60°–90° C. in the course of 30 minutes, an aqueous solution of the maleic acid diammonium salt being obtained. This mixture was heated to 150° C. in the course of 30 minutes and stirred at this temperature for 30 minutes. A pressure of 8 bar built up during this operation. After cooling with addition of 100 g of water, a viscous mixture which had the following elemental composition was obtained:

Elemental analysis: C: 20.4% N (total): 13.5% N (hydrolyzable): 1.9% $NH_4^+$: 6.8%

The reaction mixture contained 15% of aspartic acid and asparagine in monomeric form and 5% of maleic acids, based on the amounts employed. The crude reaction mixture was hydrolyzed with 20% strength sodium hydroxide solution at about 105° C., the ammonia liberated being distilled off, until the residual content of hydrolyzable nitrogen was less than 3%. 2.5 mol of NaOH were required for this. An aqueous solution of the salt of a polyaspartic acid copolymer was obtained. The average molecular weight (Mw) was 1330.

re Examples 3 and 4

The polymerization reactions were carried out in a high-viscosity reactor of the Lurgi Selfcleaner type from Lurgi. The "Selfcleaner" is a continuously self-cleaning co-rotating twin screw extruder with hollow shafts. A heat transfer medium flowed through both the hollow shafts and the housing jacket for temperature control. The temperature program was as follows: the liquid heat transfer medium flowed first through the hollow shafts, then entered the last hollow screw thread close to the product discharge, and flowed through the screw threads in countercurrent to the product transported in the trough. The apparatus had several devolatilization domes which could be opened and closed as required. Any desired water or water vapor content in the reaction mixture could be established with the aid of these. The hollow screws of the "Selfcleaner" had a self-cleaning circular profile. The thread of one hollow screw projected entirely, except for a certain play, into the thread gap of the other screw. The play between the two hollow shafts on the one hand and between the hollow shafts and the trough on the other hand was about 3 mm. The apparatus used had the following dimensions: L=900 mm,+=100 mm.

Example 3

Preparation of an iminosuccinate-containing polysuccinimide-polyaspartic acid copolymer from maleamic acid ammonium salt 16 kg of maleamic acid ammonium salt (120.3 mol), melting point 132° C., were introduced continuously, at a metering rate of 6 kg/hour via a conveying screw, into the mixing part of the screw, which had been heated at 145°–150° C. A thin film of melt was immediately formed on the hot surface of the screw shaft in the mixing zone and polymerized, water of reaction escaping. As the screw ran further, the polymer was dried completely and left the screw as a coarse-grained to pulverulent composition. 13,490 g of product were obtained.

Elemental analysis: C: 42% N (total): 20% N (hydrolyzable): 4.0%

$NH_4^+$: 5.4%

The average molecular weight Mw after conversion into the sodium salt analogously to Example 1 and 2 was 1720.

EXAMPLE 4

Preparation of an iminodisuccinate-containing polysuccinimide-polyaspartic acid copolymer from diammonium maleate 13 600 g of 25% strength ammonia solution (200 mol) were added to a mixture of 9 800 g (100 mol) of maleic anhydride and 2 825 g of water at 60° C. in the course of one hour. A 57% strength solution of the diammonium salt of maleic acid in water was obtained. The hot solution, at about 60° C., was heated to about 140°–150° C. with the aid of a multiphase helical tube evaporator. During this operation, a relatively large proportion of the water was evaporated off from the solution and a water-containing melt solution was obtained. This was metered at a rate of 3 kg/hour into the mixing part of the screw, which had been heated to 152°–154° C. The water of the solution was immediately evaporated off in the mixing part and the dry ammonium salt was formed briefly, but was dissolved again in the saturated water vapor atmosphere within the screw. This process led to the formation of a mixed phase of highly concentrated solution and melt. This effect allowed the formation of the characteristic melt film at a temperature of only 148°–152° C. (measured in the melt), which was significantly below the melting point (171° C.) of the pure salt. As the screw ran further, the solution water and water of reaction were removed completely and 12 000 g of a coarse-grained to pulverulent product were again obtained.

Elemental analysis: C: 38.2% N (total): 18.8% N (hydrolyzable): 4.3% $NH_4^+$: 5.85%

The average molecular weight Mw after conversion into the sodium salt analogously to Example 1 and 2 is 1650.

re Example 5 and 6

The following Examples 5 and 6 were carried out in a reactor system which comprised a jet mixer of the smooth jet nozzle construction and a subsequent tube reactor or multiphase helical tube reactor. If appropriate, the thermal polymerization was ended in a downstream, continuously operated, self-cleaning co-rotating twin screw extruder and fitted with hollow shafts. In the examples, molten maleic anhydride was injected in by means of a smooth jet nozzle together with aqueous ammonia solution and was mixed in rapidly in the tube reactor or multiphase helical coil reactor.

Example 5

A multiphase helical tube reactor provided with a smooth jet nozzle as the jet mixer and without a downstream high-viscosity reactor was used in this example. Molten maleic anhydride at 100 ° C. was mixed with cold 45% strength by weight aqueous ammonia solution, at 7° C., via a smooth jet nozzle of 0.5 mm nozzle cross section and the mixture was metered into the multiphase helical tube reactor. After a reaction space length of 630 cm, to maintain the pressure, a valve of variable internal diameter up to 15 mm was inserted into the tube of the multiphase helical tube reactor in order to adjust the pressure and temperature in the desired manner. A delay tube with a length of 40 cm led from the multiphase helical tube reactor to a downstream 50 l stirred tank, into which 20 kg of water were initially introduced. The maleic anhydride melt was forced at a material stream of 29.8 kg/hour under 46 bar through the smooth jet nozzle into the reaction space. The aqueous ammonia solution was metered into the reaction space at 14.65 kg/hour under 30 bar. The molar ratio of maleic anhydride to ammonia was 1:1.7. The temperature in the reaction space was 174°–187° C. When the mixture was let down after the valve, a reduction in temperature to only about 167° C. occurred due to evaporation of water. The hot mixture was passed into the reservoir tank, which was temperature controlled at 60° C., and 45% strength by weight sodium hydroxide solution was metered in, the pH being kept at about 10.3 by regulation. The hydrolysis was continued until the residual content of hydrolyzable nitrogen was less than 5% of theory. An orange-red aqueous polyaspartic acid copolymer sodium salt solution was obtained. According to GPC measurement, the solid isolated had an average molecular weight Mw of 1300. The product showed very good sequestering properties, and good heavy metal masking properties.

Example 6

A multiphase helical tube reactor provided with a smooth jet nozzle as a jet mixer and without a downstream high-viscosity reactor was used in this example. Molten maleic anhydride at 100° C. was mixed with cold 40% strength by weight aqueous ammonia solution, at 7° C., via a smooth jet nozzle of 0.5 mm nozzle cross section and metered into the multiphase helical tube reactor. After a reaction chamber length of 2340 cm, to maintain the pressure, a valve of variable internal diameter up to 15 mm was inserted into the tube of the multiphase helical tube reactor in order to adjust the pressure and temperature in the desired manner. A delay tube with a length of 40 cm led from the multiphase helical tube reactor to a downstream 50 l stirred tank, into which 20 kg of water had been initially introduced. The maleic anhydride melt was forced at a material flow of 18.7 kg/hour under 40 bar through the smooth jet nozzle into the reaction space. The aqueous ammonia solution was metered into the reaction space under 25 bar at 19.5 kg/hour. The molar ratio of maleic anhydride to ammonia was 1:2.4. The temperature in the reaction space was 163°–172° C. When the mixture was let down after the valve, a reduction in temperature to only about 154° C. occurred due to evaporation of water. The hot mixture was passed into the reservoir tank, which was temperature controlled at 60° C., and 45% strength by weight sodium hydroxide solution was metered in, the pH being kept at about 10.3 by regulation. The hydrolysis was continued until the residual content of hydrolyzable nitrogen was less than 5% of theory. An orange-red aqueous polyaspartic acid copolymer sodium salt solution was obtained. According to GPC measurement, the solid isolated had an average molecular weight Mw of 850. The product showed very good sequestering properties, and good heavy metal masking properties.

Example 7

(comparison example)

133 g (1 mol) of D,L-aspartic acid were spread in a layer thickness of about 0.5 cm over an enameled baking sheet and was heated at 220° C. under 10 mbar in a muffle furnace for 12 hours. A beige powder was obtained. According to HPLC, the aspartic acid conversion was about 99%. The resulting polysuccinimide (99 g) was hydrolyzed in aqueous solution with sodium hydroxide solution at pH 9.5 and at a temperature of 70°–80° C. The consumption of sodium hydroxide solution was 39.8 g of 100% pure NaOH. The average molecular weight Mw, measured by GPC (gel permeation chromatography) against a polyaspartic acid standard from Sigma, was 5800.

Instruction for determination of the calcium carbonate dispersing capacity (CCDC)

Procedure:

It is particularly important for all measurements that all the components which come into contact with the measurement solution are as free as possible from crystallization nuclei. This can be achieved by thorough rinsing of the components in question with dilute hydrochloric acid and subsequent rerinsing with distilled water.

To determine the CCDC value, 1.5 g of the substance to be analyzed were dissolved in 90 ml of distilled water and the solution was preneutralized with hydrochloric acid or sodium hydroxide solution. The solution was thermostatically controlled at 25.0° C., and 10.00 ml of a sodium carbonate solution having a weight content w($Na_2CO_3$)= 0.10 were added. The pH of the solution was brought to 11 by addition of 1N hydrochloric acid or 1N sodium hydroxide solution. During the titration, the pH was kept constant by means of a pH-stat.

0.1 molar calcium acetate standard solution was metered into the measurement solution at a rate of addition of 0.5 ml/minute. The degree of the resulting clouding was measured as the loss of light transmission by means of a fiber-optic photometer at λ=650 nm. The titration was measured starting from 100% transmission down to about 30%.

The endpoint of the titration was represented by the intercept of the linearized extension of the course before and the course after the start of clouding. The volume of calcium acetate solution consumed before the endpoint was reached was determined here.

The calculated weight of calcium carbonate formed up to the endpoint per gram of co-builder substance employed was stated as the CCDC value.

TABLE II

| Example | CCDC [mg of $CaCO_3$/g of polymer] |
| --- | --- |
| 1 | 35 |
| 2 | 40 |
| 3 | 48 |
| 4 | 50 |
| 5 | 81 |
| 6 | 108 |
| 7 (comparison example) | 19 |

Determination of the heavy metal masking using the example of $H_2O_2$ stabilization, Examples 5 and 6

4 ml of copper sulfate solution (100 mg/l) and 40 mg of active compound were initially introduced into a 200 ml volumetric flask and were then topped up to 200 ml. The mixture was subsequently heated to 70° C. in a waterbath and in each case 0.8 g of 35% strength hydrogen peroxide solution was added. 20 ml aliquots were titrated iodometrically after one minute, 30 minutes and 1, 3, 5, 10 and 22 hours.

The following were used as the active compound:
1) acrylic acid/maleic acid copolymer ($M_w$~70,000),
2) ethylenediaminetetraacetic acid, Na salt (EDTA),
3) diethylenetriaminepentaacetic acid (DTPA),
4) polymer according to the invention from Example 5,
5) polymer according to the invention from Example 6.

In each case the content of $H_2O_2$ as a function of time and active compound is shown in the following table. The higher the content, the better inhibited are the heavy metals which catalyze the composition of $H_2O_2$. The polymers according to the invention inhibit practically as well as EDTA and DTPA, but these are not biologically degradable. Active compound I shows a poorer action and furthermore is not biologically degradable.

TABLE

| Time [hours] | Sample Blank value | Active compound | | | | |
|---|---|---|---|---|---|---|
| | | 1 | 2 | 3 | 4 | 5 |
| 0 | 100 | 100 | 100 | 100 | 100 | 100 |
| 0.5 | 87 | 98 | 100 | 100 | 100 | 100 |
| 1 | 81 | 96 | 100 | 100 | 100 | 100 |
| 3 | 62 | 92 | 100 | 100 | 100 | 100 |
| 5 | 43 | 87 | 100 | 100 | 98 | 100 |
| 10 | 21 | 68 | 100 | 100 | 96 | 100 |
| 22 | 0 | 0 | 100 | 100 | 94 | 100 |

We claim:

1. A polymer having repeating succinyl units wherein additionally 2 to 25 mol-% which contains iminodisuccinate units are incorporated based on the sum of all repeating units.

2. A polymer as claimed in claim 1, in which iminodisuccinate units are incorporated into the polymer as repeating units.

3. A polymer as claimed in claim 1, in which iminodisuccinate units are incorporated as end groups.

4. A polymer as claimed in claim 1, which contains succinyl units of the following formulae $$\begin{array}{c}CH_2-CO-N-\\ |\\ -CH-CO-\end{array}, \text{ and } \begin{array}{c}-CH-CO-N-\\ |\\ CH_2-CO-\end{array}.$$

5. A polymer as claimed in claim 1, which contains succinyl units of at least one of the following formulae $$\begin{array}{c}CH_2-CO\\ |\quad\quad\quad\searrow\\ \quad\quad\quad\quad N-,\\ |\quad\quad\quad\nearrow\\ -CH-CO\end{array} \quad \begin{array}{c}CH_2-CO-NH-,\\ |\\ -CH-COOH\end{array} \quad \begin{array}{c}-CH-CO-NH-,\\ |\\ CH_2-COOH\end{array}$$

β-unit    α-unit $$\begin{array}{c}CH_2-CO-NH-,\\ |\\ -CH-CO-NH_2\end{array} \quad \begin{array}{c}-CH-CO-NH-,\\ |\\ CH_2-CO-NH_2\end{array}$$

or a salt thereof.

6. A polymer as claimed in claim 1, in which the iminodisuccinate units correspond to at least one of the following formulae

[chemical structure diagrams]

in which R denotes OH, $O^-NH_4^+$ or $NH_2$.

7. A polymer as claimed in claim 1, in which the iminodisuccinate units are present to the extent of at least 0.1 mol %, based on the sum of all the repeating units.

8. A process for the preparation of a polymer with repeating succinyl units which contains iminodisuccinate units, which comprises subjecting a compound A selected from the group consisting of maleic anhydride, maleic acid, fumaric acid and derivatives thereof to thermal polymerization in the presence of a nitrogen containing, ammonia donating compound B in the presence of excess ammonia, wherein the polymerization is carried out at a temperature between 120° C. and 190° C. and wherein polymerization is carried out in a time of between 10 seconds and 150 minutes.

9. A method of using a polymer as claimed in claim 1, wherein said polymer is added to aqueous systems for complexing metals.

10. A method of using a polymer as claimed in claim 1, wherein said polymer is added to aqueous systems for inhibiting salt precipitations.

11. A method of using a polymer as claimed in claim 1, wherein said polymer is added to systems containing organic and/or inorganic particles for dispersing said particles.

12. A method of using a polymer as claimed in claim 1, wherein said polymer is added to formulations used in detergents, cleaning agents, cooling circulations, evaporators, seawater desalination plants or secondary crude oil production.

13. The process of claim 8, wherein said compound B is ammonia.

14. The process of claim 8, wherein the molar ratio of nitrogen in compound B with respect to compound A is at least 1.9.

15. A process for the preparation of a polymer with repeating succinyl units which contains iminodisuccinate units, which comprises subjecting a compound A selected from the group consisting of maleic anhydride, maleic acid, fumaric acid, maleic acid diammonium salt and maleamic acid ammonium salt to thermal polymerization in the presence of a nitrogen containing, ammonia donating compound B in the presence of excess ammonia, wherein the polymerization is carried out at a temperature between 120° C. and 190° C. and wherein polymerization is carried out in a time of between 10 seconds and 10 minutes.

16. A process according to claim 8, wherein compound A is maleic anhydride and the molar ratio of nitrogen in compound B with respect to the maleic anhydride in compound A is between 1.1 and 5.0.

17. A process according to claim 8, wherein compound A is maleic anhydride and the molar ratio of nitrogen in compound B with respect to the maleic anhydride in compound A is between 1.9 and 4.0.

18. A process according to claim 15, wherein compound A is maleic anhydride and the molar ratio of nitrogen in compound B with respect to the maleic anhydride in compound A is between 1.1 and 5.0.

19. A process according to claim 15, wherein compound A is maleic anhydride and the molar ratio of nitrogen in compound B with respect to the maleic anhydride in compound A is between 1.9 and 4.0.

20. A process according to claim 15, wherein the molar ratio of nitrogen in compound B with respect to compound A is at least 1.9.

* * * * *